(12) United States Patent
Kwa et al.

(10) Patent No.: US 8,411,586 B2
(45) Date of Patent: *Apr. 2, 2013

(54) DISPLAY PORT COMPATIBLE INTERFACE COMMUNICATIONS

(75) Inventors: Seh Kwa, Saratoga, CA (US);
Maximino Vasquez, Fremont, CA (US);
Jim Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,276

(22) Filed: Jan. 12, 2012

(65) Prior Publication Data
US 2012/0117285 A1    May 10, 2012

Related U.S. Application Data

(63) Continuation of application No. 13/089,731, filed on Apr. 19, 2011, now Pat. No. 8,121,060, which is a continuation of application No. 12/286,192, filed on Sep. 29, 2008, now Pat. No. 7,961,656.

(51) Int. Cl.
*H04L 12/56* (2006.01)
*H04J 1/16* (2006.01)

(52) U.S. Cl. ......... 370/252; 370/278; 370/282; 370/419

(58) Field of Classification Search .......... 370/252, 370/278, 282, 419
See application file for complete search history.

(56) References Cited

U.S. PATENT DOCUMENTS

| 5,919,263 | A | 7/1999 | Kikinis et al. |
|---|---|---|---|
| 7,017,053 | B2 | 3/2006 | Mizuyabu et al. |
| 7,558,264 | B1 | 7/2009 | Lolayekar et al. |
| 7,839,860 | B2 | 11/2010 | Kobayashi |
| 7,864,695 | B2 | 1/2011 | Morinaga et al. |
| 2007/0091359 | A1* | 4/2007 | Suzuki et al. ............. 358/1.15 |
| 2007/0150616 | A1 | 6/2007 | Baek et al. |
| 2008/0008172 | A1 | 1/2008 | Kobayashi |
| 2008/0143695 | A1 | 6/2008 | Juenemann et al. |
| 2009/0125940 | A1* | 5/2009 | Kim et al. ...................... 725/39 |
| 2009/0158377 | A1 | 6/2009 | Diab et al. |
| 2010/0087932 | A1 | 4/2010 | Mccoy et al. |

FOREIGN PATENT DOCUMENTS

| JP | 2005-027120 A | 1/2005 |
|---|---|---|
| JP | 2006-268738 A | 10/2006 |
| JP | 2008-084366 A | 4/2008 |
| JP | 2008-109269 A | 5/2008 |
| JP | 2008-182524 A | 8/2008 |
| TW | 243523 | 3/1995 |
| TW | 200746782 A | 12/2007 |

OTHER PUBLICATIONS

Office Action Received in Korean Patent Application No. 10-2009-92283, mailed Apr. 9, 2012, 8 pages, including 4 pages of English translation.

Section 2.2.5.4 Extension Packet, "VESA DisplayPort Standard", Video Electronics Standards Association, Version 1, Revision 1a, Jan. 11, 2008, pp. 1 and 81-83.

Panel Standardization Working Group, "Industry Standard Panels for Monitors—15.0-inch", Mounting and Top Level Interface Requirements, Panel Standardization Working Group, version 1.1, Mar. 12, 2003, pp. 1-19.

(Continued)

*Primary Examiner* — John Pezzlo
(74) *Attorney, Agent, or Firm* — Glen B Choi

(57) ABSTRACT

A computer can control a target device using a packet format described herein. In one example, an extension packet controls the target device in at least one of power consumption, image rendering, and register updating.

24 Claims, 7 Drawing Sheets

OTHER PUBLICATIONS

Office Action received for Korean Patent Application No. 10-2009-92283, mailed on Feb. 12, 2011, 2 pages of English Translation and 3 pages of Office Action.
VESA Embedded DisplayPort Standard, Video Electronics Standards Association (VESA), Version 1.3, Jan. 13, 2011, pp. 1-81.
Office Action received for Korean Patent Application No. 10-2009-111387, mailed on Mar. 9, 2011, 4 pages of English Translation and 5 pages of Office Action.
Office Action received for Japanese Patent Application No. 10-2009-222990, mailed on Aug. 2, 2011, 4 pages of Japanese Office Action including 2 pages of English Translation.
"VESA Embedded DisplayPort (eDP)", VESA eDP Standard, Copyright 2008 Video Electronics Standards Association, Version 1, Dec. 22, 2008, pp. 1-23.
"VESA Embedded DisplayPort (eDP) Standard", Embedded DisplayPort, Copyright 2008-2009 Video Electronics Standards Association, Version 1.1, Oct. 23, 2009, pp. 1-32.
"VESA Embedded DisplayPort Standard", eDP Standard, Copyright 2008-2010 Video Electronics Standards Association, Version 1.2, May 5, 2010, pp. 1-53.
Office Action Received for Chinese Patent Application No. 200910221453.6 mailed on Oct. 10, 2011, 4 pages of Office Action and 4 pages of English Translation.
Office Action received for Korean Patent Application No. 10-2009-0092283, mailed on Oct. 27, 2011, 2 pages of English Translation and 3 pages of Office Action.
Office Action received in Chinese Patent Application No. 200910221453.6, mailed Jul. 23, 2012, 5 pages of Office Action, including 2 pages of English translation.
Office Action received in Korean Patent Application No. 10-2009-92283, mailed Oct. 31, 2012, 5 pages of Office Action, including 2 pages of English translation.
Office Action received in Taiwan Patent Application No. 98132686, mailed Dec. 26, 2012, 19 pages, and 4 pages of English translation.

* cited by examiner

DISPLAY PORT COMPATIBLE INTERFACE COMMUNICATIONS

RELATED APPLICATION

The present application is a continuation of U.S. patent application Ser. No. 13/089,731, filed Apr. 19, 2011, and entitled "Protocol Extensions in a Display Port Compatible Interface" which is a continuation of U.S. patent application Ser. No. 12/286,192, entitled "Protocol Extensions in a Display Port Compatible Interface," filed Sep. 29, 2008 and claims priority there from.

FIELD

The subject matter disclosed herein relates generally to techniques for transmitting data.

RELATED ART

Some display devices are increasing their resolution and number of bits per color. Breakthroughs in resolution and color use higher data rates from the source device to the display. Standards and proprietary techniques have been defined to permit control of a display device by the source device. For example, the Video Electronics Standards Association (VESA) DisplayPort Standard, Version 1, Revision 1a (2008) defines a manner for transporting video, audio and other data between a source device and a target device over a digital communications interface. DisplayPort defines a uni-directional Main Link for transporting audio/video data streams and a half-duplex bi-directional auxiliary channel (AUX CH) for plug-and-play operations.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

As used herein, DisplayPort specification refers to The Video Electronics Standards Association (VESA) DisplayPort Standard, Version 1, Revision 1a (2008) and revisions thereof as well as compatible standards. The DisplayPort specification provides for the option to use extension packets. Use of extension packets may be negotiated by the source and target devices.

Table 2-42 from the DisplayPort specification version 1.1 (reproduced below) describes header bytes of an extension packet.

| Byte# | Content |
| --- | --- |
| HB0 | Usage of this byte is vendor specific. |
| HB1 | 04h (predefined) |
| HB2 | Usage of this byte is vendor specific. |
| HB3 | Usage of this byte is vendor specific. |

Various embodiments provide for use of the header bytes of an extension packet to describe a command and format of an extension packet. The extension packet may be used to control power usage of a target device, write a delta frame update, write a rectangular delta frame update, and configure registers or write to memory of the target device.

In some embodiments, header byte HB0 may be used to define which version of the proprietary protocol extension the packet is intended to follow. In some embodiments, header byte HB0 may be predefined as 0x1h. In some embodiments, header byte HB2 may communicate the following:

| First section | Second section | Third section |
| --- | --- | --- |
| Command | Size of payload | Whether payload stores data |

In some embodiments, header byte HB3 may define the payload size of the extension packet. The payload size may range from 1 to 256 bytes, words, double words, or quad words.

Figure 1:
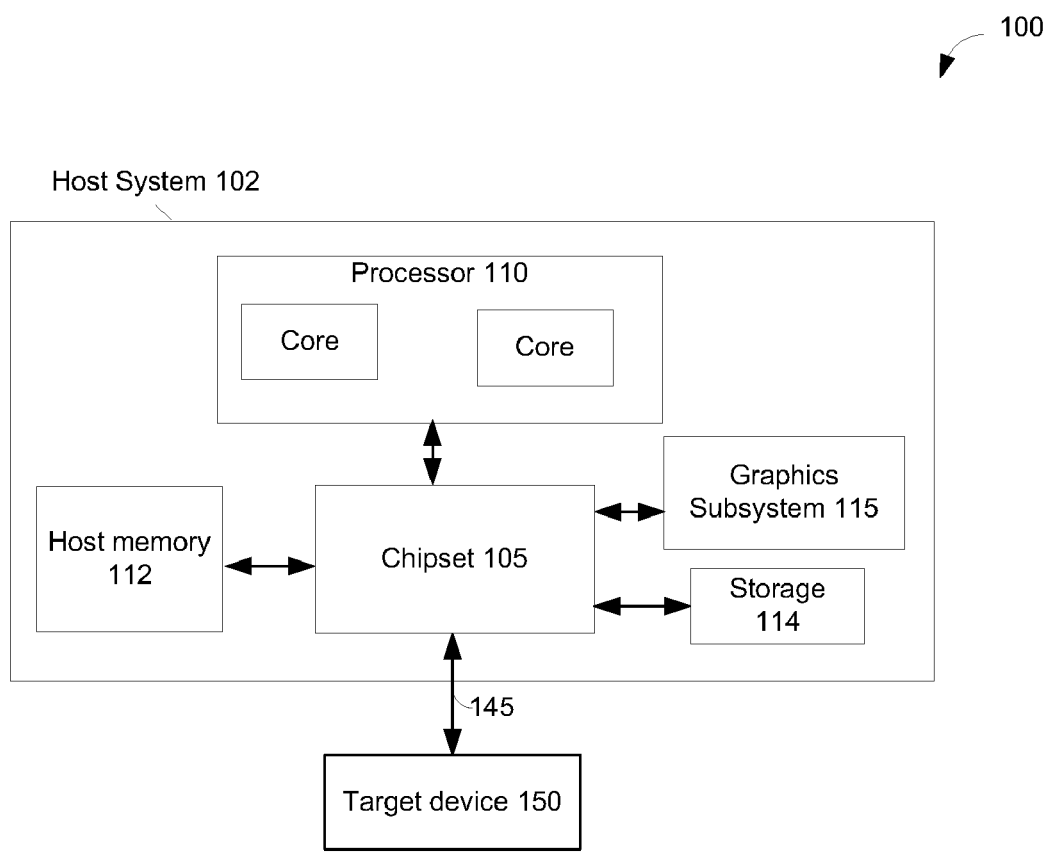
FIG. 1 depicts a system in accordance with an embodiment.

FIG. 1 depicts a system 100 in accordance with an embodiment. System 100 may include a source device such as a host system 102 and a target device 150. Host system 102 may include a processor 110 with multiple cores, host memory 112, storage 114, graphics subsystem 115. Chipset 105 may provide communicatively coupling between devices in host system 102. Graphics subsystem 115 may manage transmission of audio and video to target device 150. Various display functions can be offloaded to target device 150 from graphics subsystem 115. For example, graphics subsystem 115 may offload control of screen brightness (i.e., backlight control) to target device 150.

For example, host system 102 may transmit extension packets using interface 145 to target device 150. Interface 145 may include a Main Link and an AUX channel, both described in the DisplayPort specification. In various embodiments, host system 102 (e.g., graphics subsystem 115) may form and transmit communications to target device 150 at least in a manner described with respect to FIGS. 2-5.

Target device 150 may be a display device with capabilities to display visual content and broadcast audio content. For example, target device 150 may include control logic such as a timing controller (TCON) that controls writing of pixels as well as a register that directs operation of target device 150. In addition, target device 150 may include backlight control capabilities.

Figure 2:
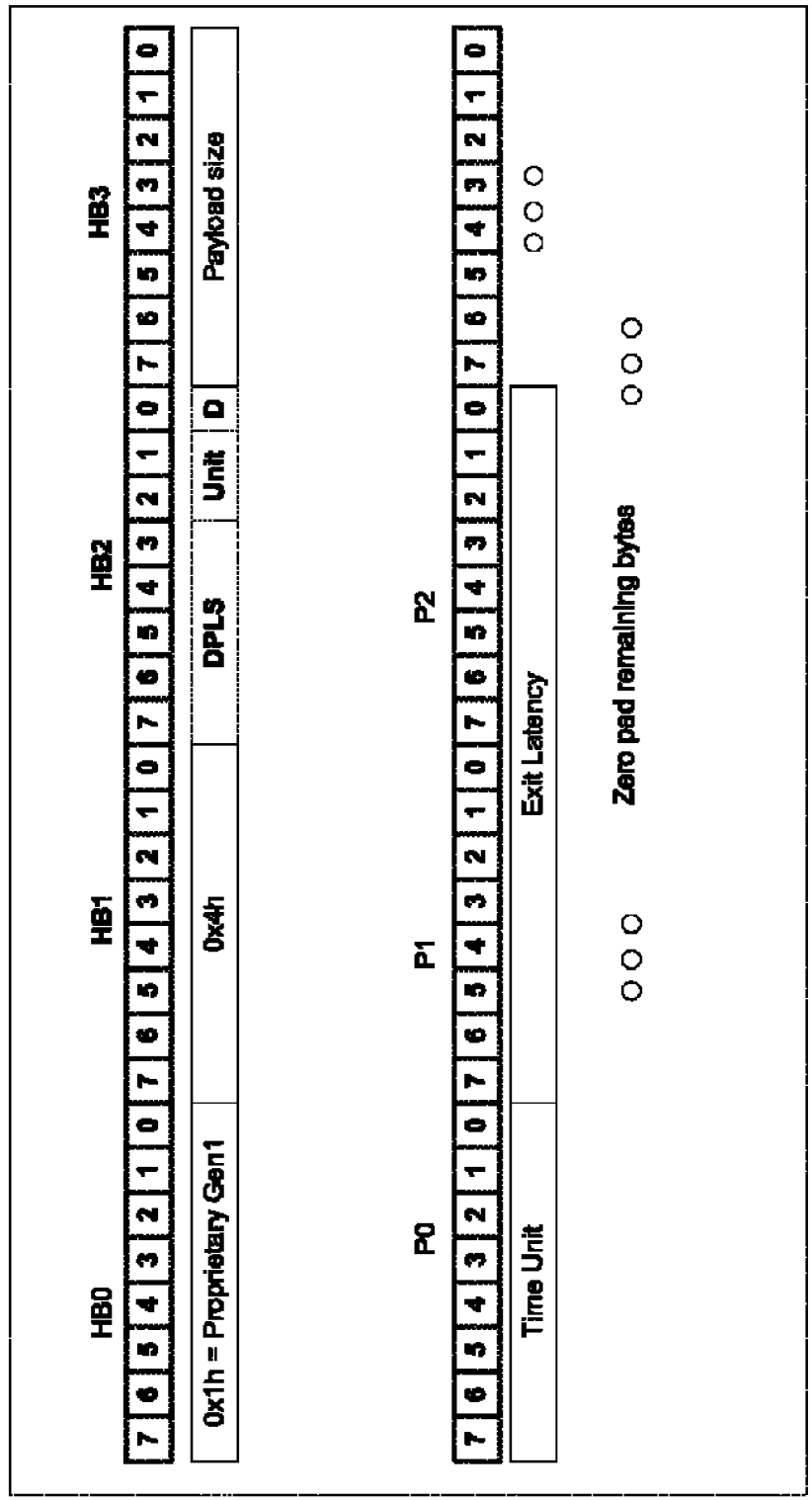
FIG. 2 depicts a manner of forming a communication that controls a target device to enter a particular power use state in accordance with an embodiment.

FIG. 2 depicts a manner of forming a communication that controls a target device to enter a particular power use state in accordance with an embodiment. Communication 200 may be transmitted using an extension packet of the DisplayPort specification. Communication 200 includes at least header portions HB0-HB3 and payload portions P0-P2. Header portion HB0 may store an indication of a generation number of the protocol. For example, HB0 may be set to 0x1h to indicate a first generation, but can be changed for subsequent generations. The target device can use the generation information to determine whether the target device is using the proper decoder logic to properly interpret the command.

Header byte HB1 may be set at 0x4h in accordance with the DisplayPort specification version 1.1.

Header byte HB2 may indicate (1) a command of a power usage state of the target device as well as (2) the amount of information conveyed by each byte in the payload (shown as Unit) and (3) whether the payload of communication 200 stores data or not (shown as D). For example, a first section (e.g., bits 7 to 3) of byte HB2 may indicate a power usage command.

| Value | Command |
| --- | --- |
| 01000 | Active |
| 01001 | Standby |
| 01010 | Idle |
| 01011 | Off |

Command active represents the current active state defined by the DisplayPort specification. Command standby may cause the differential link (e.g., Main Link) to be placed in electrical idle to save power when the Main Link interface speed is faster than the frame rate and resolution of the display panel. Command idle state may cause the Main Link to be power managed with associated PLL and clocks in low power states for scenarios such as data is only pushed during alternative frame or delta frame update. Command off state may be the disconnect state of the Main Link, where the Main Link can be completely powered off.

A second section (e.g., bits 2 and 1) of byte HB2 may indicate the amount information conveyed in each byte of a payload section of communication 200. The following scheme may be used to indicate a size of the information conveyed in each byte of the payload.

| Value | Command |
| --- | --- |
| 00 | Byte |
| 01 | Word |
| 10 | Dword |
| 11 | Qword |

A third section (e.g., bit 0) of byte HB2 may indicate whether the payload of command 200 includes data. In one example, if bit 0 is 0, no data is included in the payload but when bit 0 is 1, data is included in the payload. For example, if command 200 indicates an active mode, then no exit latency may be stated and no data can be transmitted in the payload and the exit latency may have been indicated in an earlier communication that requested entering lower power use mode.

Header byte HB3 may indicate a number of bytes in a payload portion of communication 200. To communicate power usage, header portion HB3 may be set to 0x3h to indicate three payload bytes (portions P0 to P2).

When the third section of byte HB2 indicates that payload of communication 200 includes data, payload portions P1 and P2 collectively indicate the exit latency time whereas payload portion P0 includes the time unit of the exit latency time. Exit latency time may be the time to reaching the active state from a lower power state (e.g., standby, idle, or off). The following scheme may be used in portion P0 to indicate a time unit of the exit latency indicated by portions P1 and P2.

| Value of P0 | Time unit of exit latency |
| --- | --- |
| 0x8h | Nanosecond |
| 0x9h | Microsecond |
| 0x10h | Millisecond |

Figure 3:
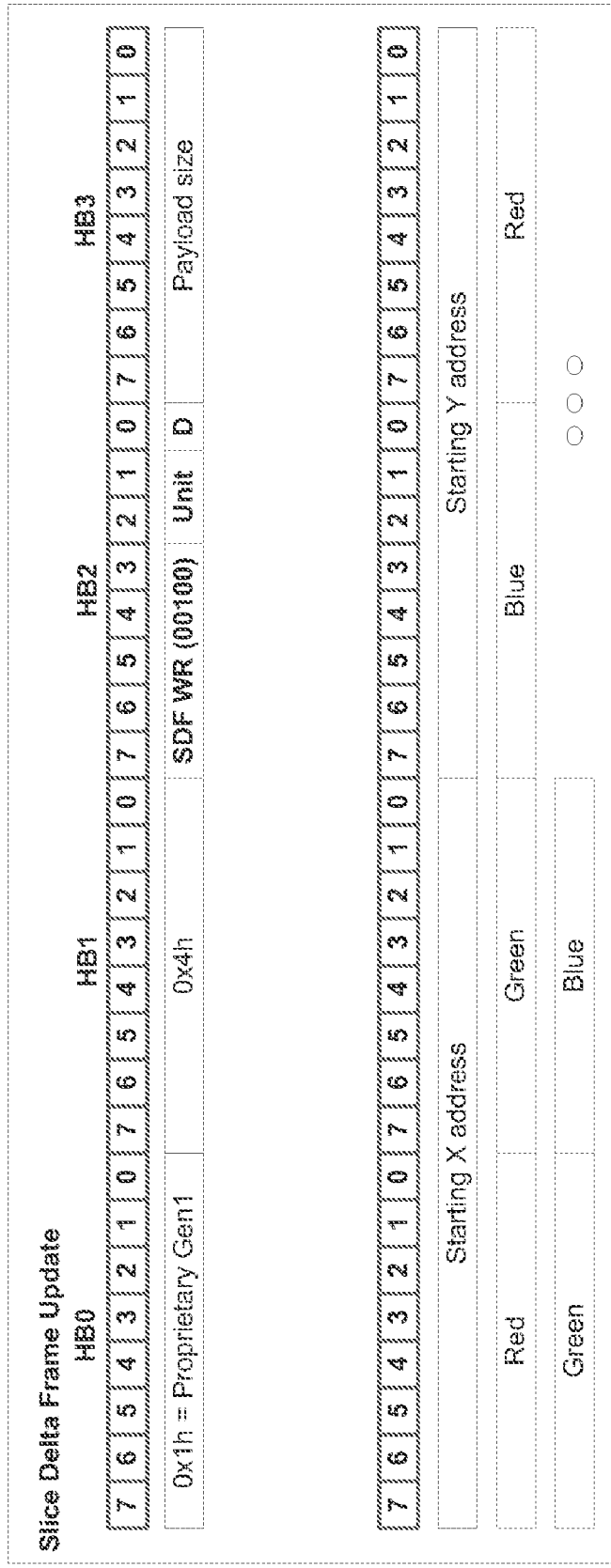
FIG. 3 depicts a communication that can be used as a delta frame update of a slice of the display frame in accordance with an embodiment.

FIG. 3 depicts a communication 300 that can be used as a delta frame update of a slice of the display frame in accordance with an embodiment. Communication 300 can be used for a slice delta frame update. Header bytes HB0 and HB1 of communication 300 may be substantially similar to those of communication 200. Header byte HB2 may include (1) a first section that indicates communication 300 requests writing of a delta frame slice, (2) a second section that indicates an amount of information conveyed in each byte in the payload, and (3) a third section that indicates whether the payload of communication 300 stores data or not. In this example, the first section of portion HB2 is 00100 to indicate writing of a delta frame slice, although other values may be used. Second and third sections of portion HB2 (e.g., unit and D) may be similar to those of communication 200. Header byte HB3 may indicate a number of bytes in a payload of communication 300.

In this example, when the third section of portion HB2 indicates the payload of communication 300 includes data, the first two bytes of the payload store a starting X pixel coordinate of the write and the second two bytes of the payload store a starting Y pixel coordinate of the write. The ensuing payload portions may store color values of red, green, and blue portions of each pixel until the end of the slice. Pixels may be written in order from left edge to the right edge of the displayed area. The last red, green, and blue color values in the payload may correspond to the bottom right hand corner of an image slice.

Red, green and blue color codes for each pixel can be byte-aligned. However, the color code can vary in number of bits to represent color depth, and the size of information in the payload (e.g., second section of portion HB2) may allow for variations in number of data bits for each pixel. For example, if 10 bits are used to represent each color, then there could be 30 consecutive bits to represent red, green and blue for each pixel.

In one embodiment, the maximum number of pixels that a single packet can carry is 1364 because of the field size reserved for payload information and the unit of the payload size (which amounts to 4 kilobytes). Frame slices that require more than the 4 kilobytes of information in the payload may do so through multiple packets.

Figure 4:
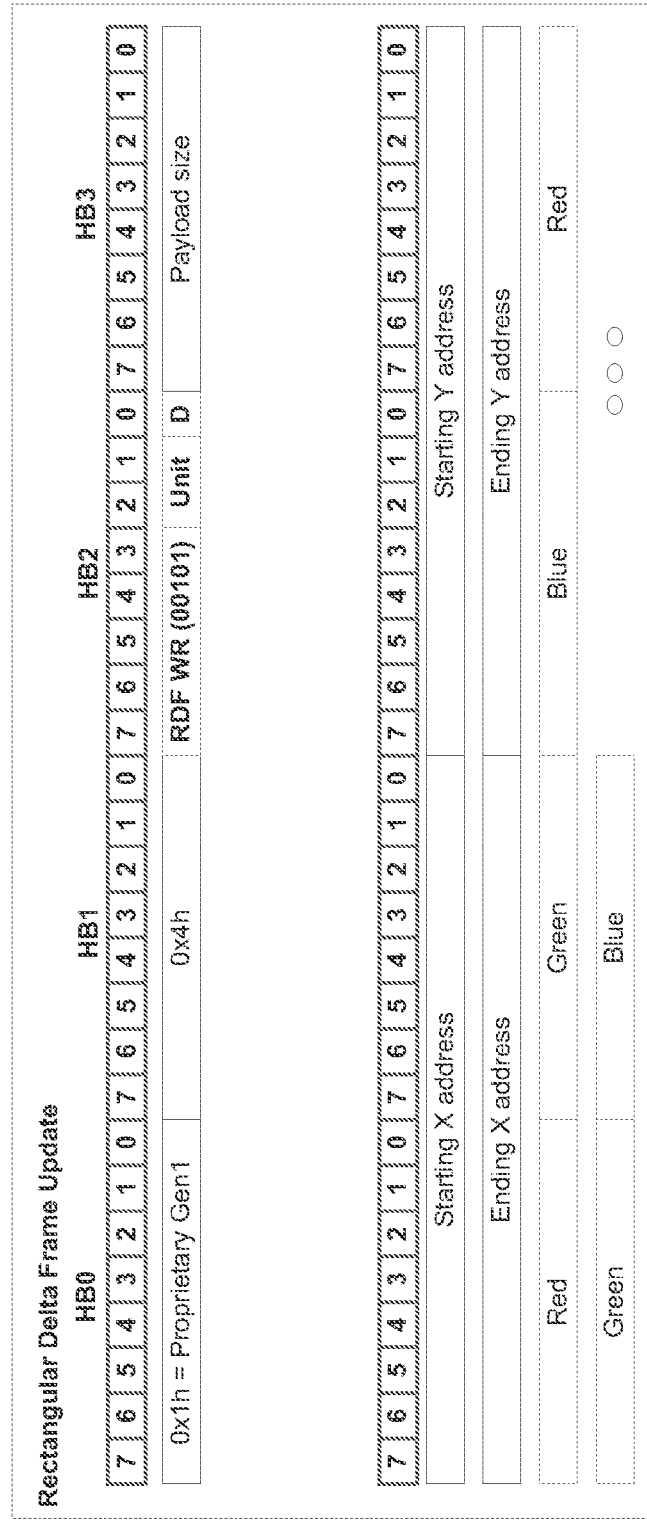
FIG. 4 depicts a communication that can be used to write pixels in a region in accordance with an embodiment.

FIG. 4 depicts a communication 400 that can be used to write pixels in a region in accordance with an embodiment. Communication 400 is similar to communication 300 except that its payload portion indicates both starting and ending X, Y pixel coordinate of an image. Communication 400 can be used to write a portion of a displayed area in which the displayed area does not reach an edge. Communication 400 can be used for a rectangular delta frame update.

Figure 5:
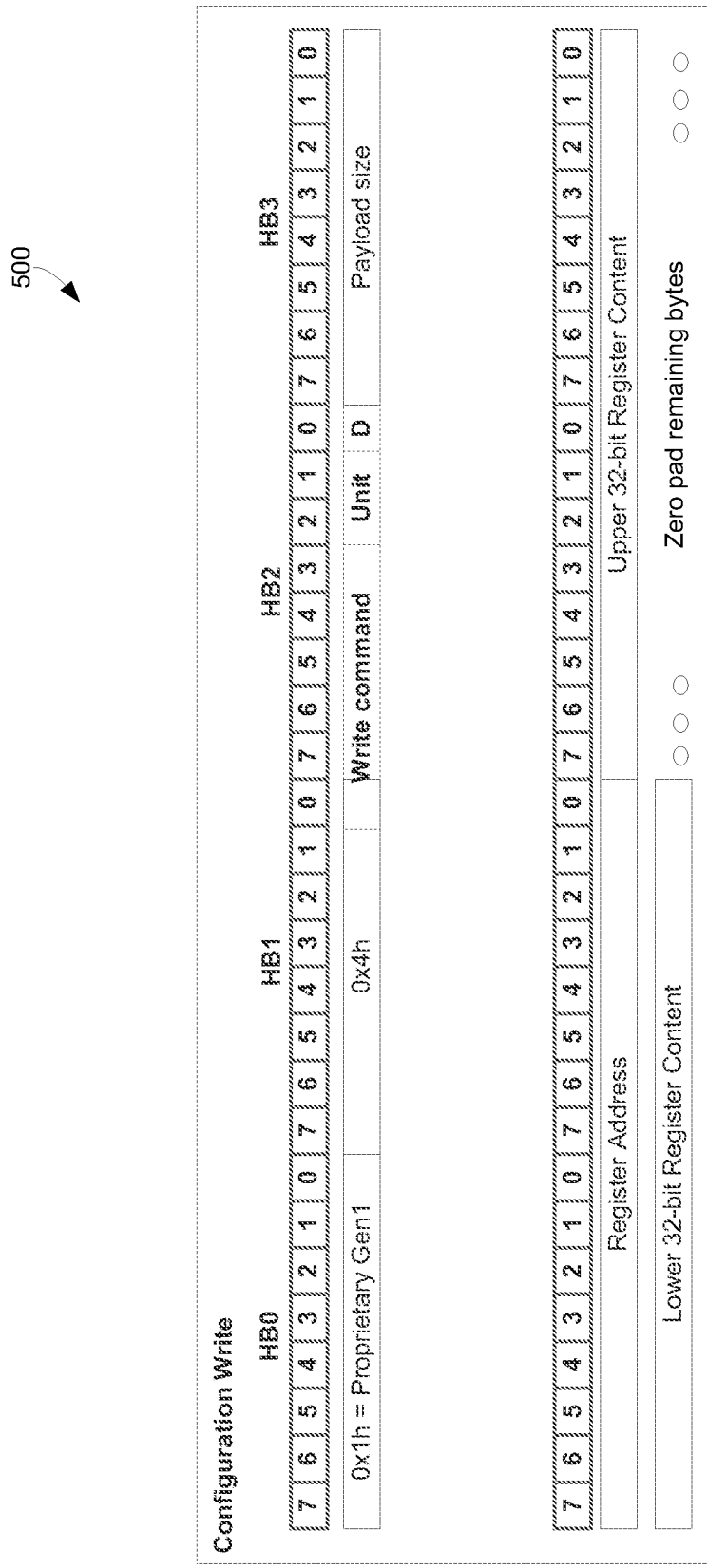
FIG. 5 depicts a communication that can be used to write to a memory location in a target device in accordance with an embodiment.

FIG. 5 depicts a communication 500 that can be used to write to a memory location in a target device in accordance with an embodiment. Portions HB0 and HB1 of communication 500 may be substantially similar to those of communication 200. Portion HB2 may include (1) a first section that indicates communication 500 requests writing to a memory location, (2) a second section that indicates the size of information of each byte in the payload (shown as Unit), and (3) a third section that indicates whether the payload of communication 500 stores data or not (shown as D). In this example, the first section of portion HB2 is 00010 to indicate writing to a register, although other values may be used. The second and third sections of portion HB2 may be similar to those of communication 200.

Header byte HB3 may indicate a size of a payload of communication 500. In this example, portion HB3 is set to 0x6h to indicate 6 bytes of payload.

In this example, the payload portion of communication 500 stores the register or memory address that is to be written followed by content to be written to the address.

Communication 500 can be used for hardware level co-ordination of functionality between a source device such as an Intel CPU and a target device such as timing controller in a display panel so that the CPU does not have to be burdened with software overhead during idle. Communication 500 can be used for direct register configuration capability through Display Port natively instead of using the AUX channel. The AUX channel is an interconnect between a processor and display that allows software to control registers, but at a low speed. Use of extension packets can allow must faster control than use of the AUX channel.

Figure 6:
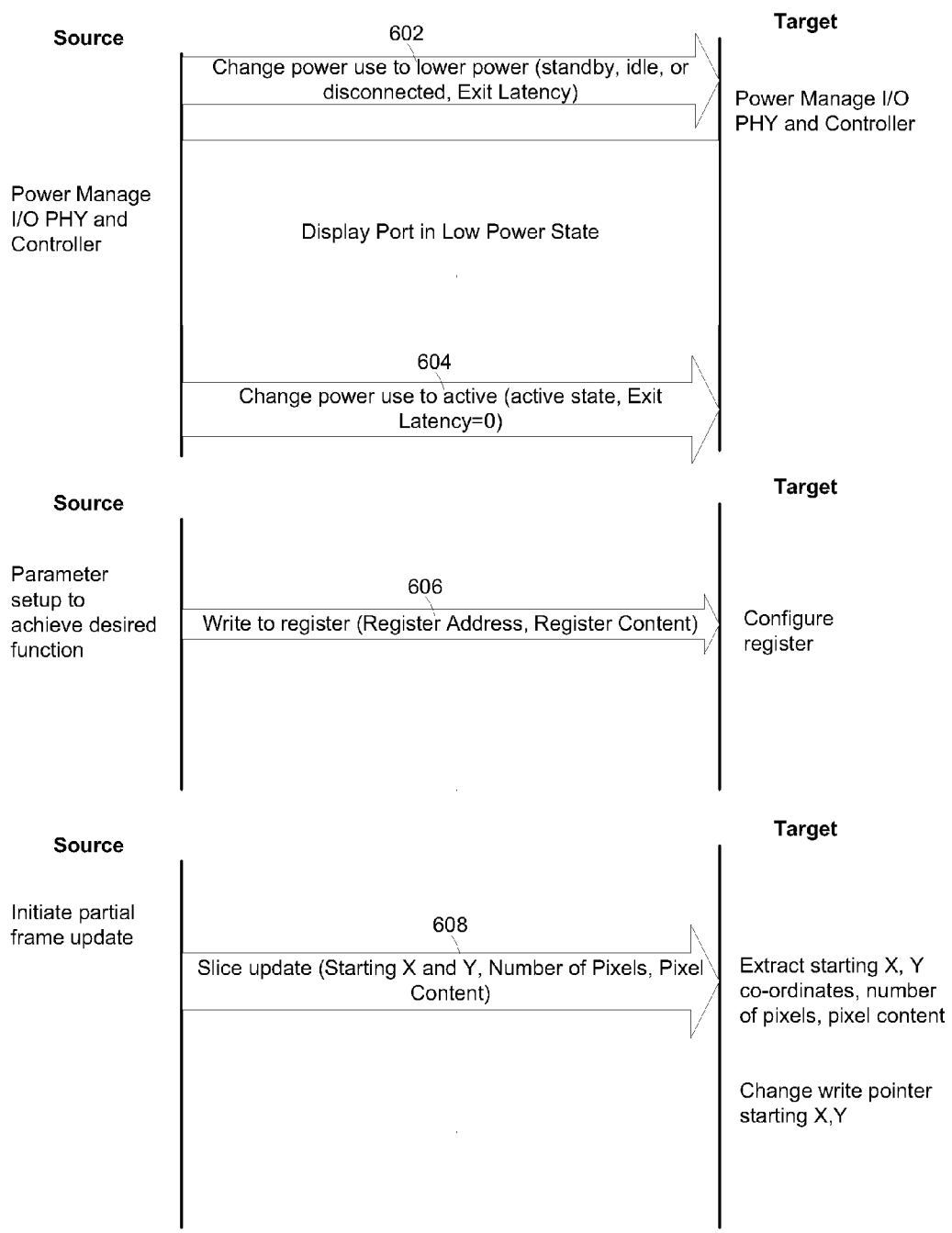
FIG. 6 depicts an example of communications from a source to a target using extension packets in accordance with an embodiment.

FIG. 6 depicts an example of communications from a source to a target using extension packets in accordance with an embodiment. Communication 602 can be used to reduce power use of the input/output (I/O) PHY and controller of the target to opportunistically shutdown unused resources that can tolerate the advertised exit latency. Communication 604 can be used to restore the target device to active mode.

Communication 606 can be used to configure a register in a target device to enable desired function with updated parameters.

Communication 608 can be used to update a displayed region. The target device may respond to communication 608 by writing pixels in communication 608 starting at the specified starting X and Y address.

Figure 7:
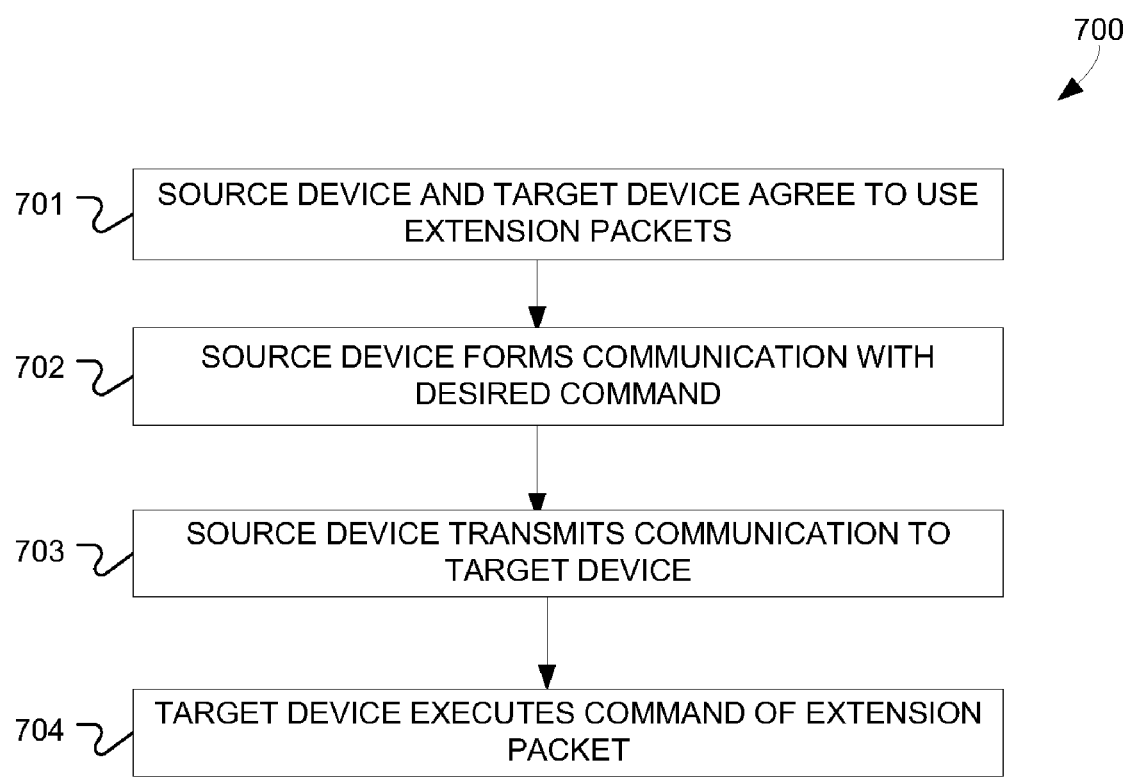
FIG. 7 depicts a process in accordance with an embodiment.

FIG. 7 depicts a process 700 in accordance with an embodiment. Block 701 may include a source device and target device negotiating use of extension packets. The DisplayPort specification describes a manner to negotiate use of extension packets.

Block 702 may include the source device forming a communication with a desired command. If the source device is to set a power consumption mode of a target device, then the format of the communication may be communication 200. If the source device is to transmit an image to a target device for display, then the format of the communication may be communication 300 or 400. If the source device is to program a register of a target device, then the format of the communication may be communication 500.

Block 703 may include the source device transmitting the communication according to a first protocol to the target device. The first protocol may be the DisplayPort specification, although other standards may be used. The communication may be transmitted using an I/O PHY and Main Link constructed in accordance with the DisplayPort specification, although other standards may be used.

Block 704 may include the target device executing the instruction in the communication. For example, if power consumption of the target device is to be established, then the target device may set its power consumption to that set by the communication. For example, if an image is to be displayed, then the target device may display the image in a manner set by the communication. For example, if a register is to be programmed, then the target device may perform based on the programming of the register.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
receiving a communication, wherein the communication is to control a target device in one or more of, or a combination of, power consumption and image display, wherein the communication includes a header and a payload and wherein the header includes (i) a first portion that defines a generation number of the communication and (ii) a second portion that indicates a payload size and the communication includes a portion that defines a command; and configuring the target device based at least in part on the communication.

2. The method of claim 1, wherein
when the communication is to control power consumption, the command is selected from among a group consisting of active and off.

3. The method of claim 1, wherein
when the communication is to control image display, the communication defines one or more of:
an update of a portion of a displayed image, the portion capable of being displayed at least once,
an image to display, the image capable of being displayed at least once, and
an update of a portion of a displayed image and wherein the payload defines starting and ending coordinates of the portion, the portion capable of being displayed at least once.

4. The method of claim 1, wherein when the communication is to control a target device in one or more of, or a combination of, power consumption and image display, the communication is to control a target device in power consumption and image display.

5. The method of claim 1, wherein the target device comprises a display controller and the communication complies with a version of Display Port specification.

6. A system comprising:
a display; and
a computer system communicatively coupled to the display, the computer system comprising a multi-core processor, a graphics processor, and an output logic, wherein:
the computer system is to request to form a communication, wherein the communication is to control a target device in at least one or more of power consumption and image display, wherein the communication is to include a header and a payload and wherein the header is to include (i) a first portion that is to define a generation number of the communication and (ii) a second portion that is to indicate a payload size and the communication is to include a portion that is to define a command; and
the computer system is to request to transmit the communication to the target device by use of the output logic.

7. The system of claim 6, wherein
when the communication is to control power consumption, the command is selected from among a group consisting of active and off.

8. The system of claim 6, wherein
when the communication is to control image display, the communication defines one or more of:
an update of a portion of a displayed image, the portion capable of being displayed at least once,
an image to display, the image capable of being displayed at least once, and
an update of a portion of a displayed image and wherein the payload defines starting and ending coordinates of the portion, the portion capable of being displayed at least once.

9. The system of claim 6, wherein when the communication is to control a target device in one or more of, or a combination of, power consumption and image display, the communication is to control a target device in power consumption and image display.

10. The system of claim 6, wherein
the target device comprises a display controller for the display,
the communication complies with a version of Display Port specification, and
the output logic complies with a version of Display Port specification.

11. At least one article of manufacture including a machine readable medium having instructions stored thereon, which when executed cause:
at least one machine to request to form a communication, wherein the communication is to control a target device in at least one or more of power consumption and image display, wherein the communication includes a header and a payload and wherein the header includes (i) a first portion that defines a generation number of the communication and (ii) a second portion that indicates a payload size and the communication includes a portion that defines a command; and
at least one machine to request to transmit the communication to the target device.

12. The article of manufacture of claim 11, wherein when the communication is to control power consumption, the command is selected from among a group consisting of active and off.

13. The article of manufacture of claim 11, wherein
when the communication is to control image display, the communication defines one or more of:
an update of a portion of a displayed image, the portion capable of being displayed at least once,
an image to display, the image capable of being displayed at least once, and
an update of a portion of a displayed image and wherein the payload defines starting and ending coordinates of the portion, the portion capable of being displayed at least once.

14. The article of manufacture of claim 11, wherein when the communication is to control a target device in one or more of, or a combination of, power consumption and image display, the communication is to control a target device in power consumption and image display.

15. The article of manufacture of claim 11, wherein the target device comprises a display controller and the communication complies with a version of Display Port specification.

16. An apparatus comprising:
a processor system comprising a multi-core processor and a graphics processor, wherein:
the processor system is configure to request to form a communication, wherein the communication is to control a target device in at least one or more of power consumption and image display, wherein the communication is to include a header and a payload and wherein the header is to include (i) a first portion that is to define a generation number of the communication and (ii) a second portion that is to indicate a payload size and the communication is to include a portion that is to define a command; and
the processor system is configured to request to transmit the communication to the target device.

17. The apparatus of claim 16, wherein
when the communication is to control power consumption, the command is selected from among a group consisting of active and off.

18. The apparatus of claim 16, wherein
when the communication is to control image display, the communication defines one or more of:
an update of a portion of a displayed image, the portion capable of being displayed at least once,
an image to display, the image capable of being displayed at least once, and
an update of a portion of a displayed image and wherein the payload defines starting and ending coordinates of the portion, the portion capable of being displayed at least once.

19. The apparatus of claim 16, wherein the target device comprises a display controller and the communication complies with a version of Display Port specification.

20. An apparatus configured to:
receive a communication, wherein the communication is to control a target device in one or more of, or a combination of, power consumption and image display, wherein the communication is to include a header and a payload and wherein the header is to include (i) a first portion that is to define a generation number of the communication and (ii) a second portion that is to indicate a payload size and the communication is to include a portion that is to define a command; and
configure the target device based at least in part on the communication.

21. The apparatus of claim 20, wherein
when the communication is to control power consumption, the command is selected from among a group consisting of active and off.

22. The apparatus of claim 20, wherein
when the communication is to control image display, the communication defines one or more of:
an update of a portion of a displayed image, the portion capable of being displayed at least once,
an image to display, the image capable of being displayed at least once, and
an update of a portion of a displayed image and wherein the payload defines starting and ending coordinates of the portion, the portion capable of being displayed at least once.

23. The apparatus of claim 20, wherein the target device comprises a display controller and the communication complies with a version of Display Port specification.

24. The apparatus of claim 20, wherein the target device comprises a display.

* * * * *